United States Patent [19]
Collins

[11] Patent Number: 5,668,526
[45] Date of Patent: Sep. 16, 1997

[54] INFANT MONITORING SYSTEM FOR AUTOMOBILES

[76] Inventor: Brenda M. Collins, 46 Wheelock Ave., Millbury, Mass. 01527

[21] Appl. No.: 668,349

[22] Filed: Jun. 26, 1996

[51] Int. Cl.⁶ .................................................. G08B 27/00
[52] U.S. Cl. ............................................ 340/326; 359/871
[58] Field of Search ........................... 359/871, 872; 340/326, 555, 556, 573

[56] References Cited

U.S. PATENT DOCUMENTS

| | | | |
|---|---|---|---|
| D. 320,634 | 10/1991 | Fortune et al. | D21/173 |
| 4,624,539 | 11/1986 | King | 350/632 |
| 4,702,572 | 10/1987 | Cossey | 350/639 |
| 4,712,892 | 12/1987 | Masucci | 359/871 |
| 4,733,956 | 3/1988 | Erickson | 350/624 |
| 4,902,118 | 2/1990 | Harris | 359/871 |
| 4,909,618 | 3/1990 | Gardner | 350/623 |
| 5,059,149 | 10/1991 | Stone | 446/73 |
| 5,310,377 | 5/1994 | Joja | 446/219 |
| 5,433,643 | 7/1995 | Pratt | 446/73 |
| 5,489,231 | 2/1996 | Leyser | 446/302 |

Primary Examiner—Jeffery Hofsass
Assistant Examiner—Anh La
Attorney, Agent, or Firm—Jerry C. Ray

[57] ABSTRACT

A system for visually monitoring infants in rear-facing infant carriers in the rear seats of autos includes a front mirror mounted in the driver's forward field of vision, and a rear mirror mounted in a rear mirror assembly on the backrest of the auto's rear seat. Front and rear mirrors are adjustable so the driver can visually monitor the infant without taking her eyes from the road. The rear mirror assembly is made attractive to the infant by being in the likeness of a teddy bear, a clown, or an activity center with an assortment of devices to engage the infant's attention. The rear mirror assembly also includes pockets on either side, battery-powered lights, cassette tape players, etc.

7 Claims, 3 Drawing Sheets

INFANT MONITORING SYSTEM FOR AUTOMOBILES

CROSS REFERENCE TO RELATED APPLICATIONS

None.

BACKGROUND OF THE INVENTION

1. Field of the Invention

This invention relates to devices for visually monitoring infants in automobiles, and specifically to such devices allowing a driver to visually monitor an infant in a rear-facing infant carrier in the back seat of an automobile.

2. Description of the Related Art

It is well known that infants, because of their small size and light weight, are particularly subject to injury in auto accidents. Infants as passengers are safest when restrained in an infant carrier or infant car seat; the safest position for such an infant carrier is strapped into the rear seat, with the carrier facing backwards.

The problem is that when the baby's mother is driving the car, with the baby in the position described above, mother cannot look at her baby without turning her head. And the baby is more likely to be upset because he cannot see his mother, either. What is needed, therefore, is a device that allows mother and baby to see each other, and allows the mother to monitor her baby without taking her eyes off the road.

SUMMARY OF THE INVENTION

The present invention allows the driver of a car to look into a mirror mounted in the driver's forward field of vision and see the reflection of her baby in an infant carrier in the rear seat. A mirror assembly is attached to an adjustable mounting bar which releasably engages the backrest of the rear seat; a rear mirror in the assembly is adjusted to be visible in the front mirror. A parent (or other person) driving the car can look at the baby without taking her eyes from the road, thus decreasing the likelihood of an accident. By looking in the mirror, a mother can tell whether her baby is sleeping, is upset, or whatever. In addition, the baby is comforted by being able to see the face of the driver in the rear mirror. The baby is attracted to the mirror assembly because it looks like a teddy bear or some other friendly figure.

Based on the above, it is an object of this invention to provide a system allowing a driver of an auto to visually monitor an infant in a rear-facing infant carrier in the rear seat.

A further object is to provide a monitoring system allowing a driver to observe her baby without taking her eyes from the road, thus improving driving safety.

Another object is to improve the safety of infants in autos by encouraging the use of rear-facing, back seat infant carriers.

Another object is to provide a system by which babies in rear-facing infant carriers can see the driver of the car.

Further objects are to achieve the above with a device that is sturdy, compact, durable, lightweight, simple, safe, and reliable, yet inexpensive and easy to manufacture, install, and maintain.

The specific nature of the invention, as well as other objects, uses, and advantages thereof, will clearly appear from the following description and from the accompanying drawings, the different views of which are not necessarily scale drawings.

CATALOG OF THE ELEMENTS

Figure 1:
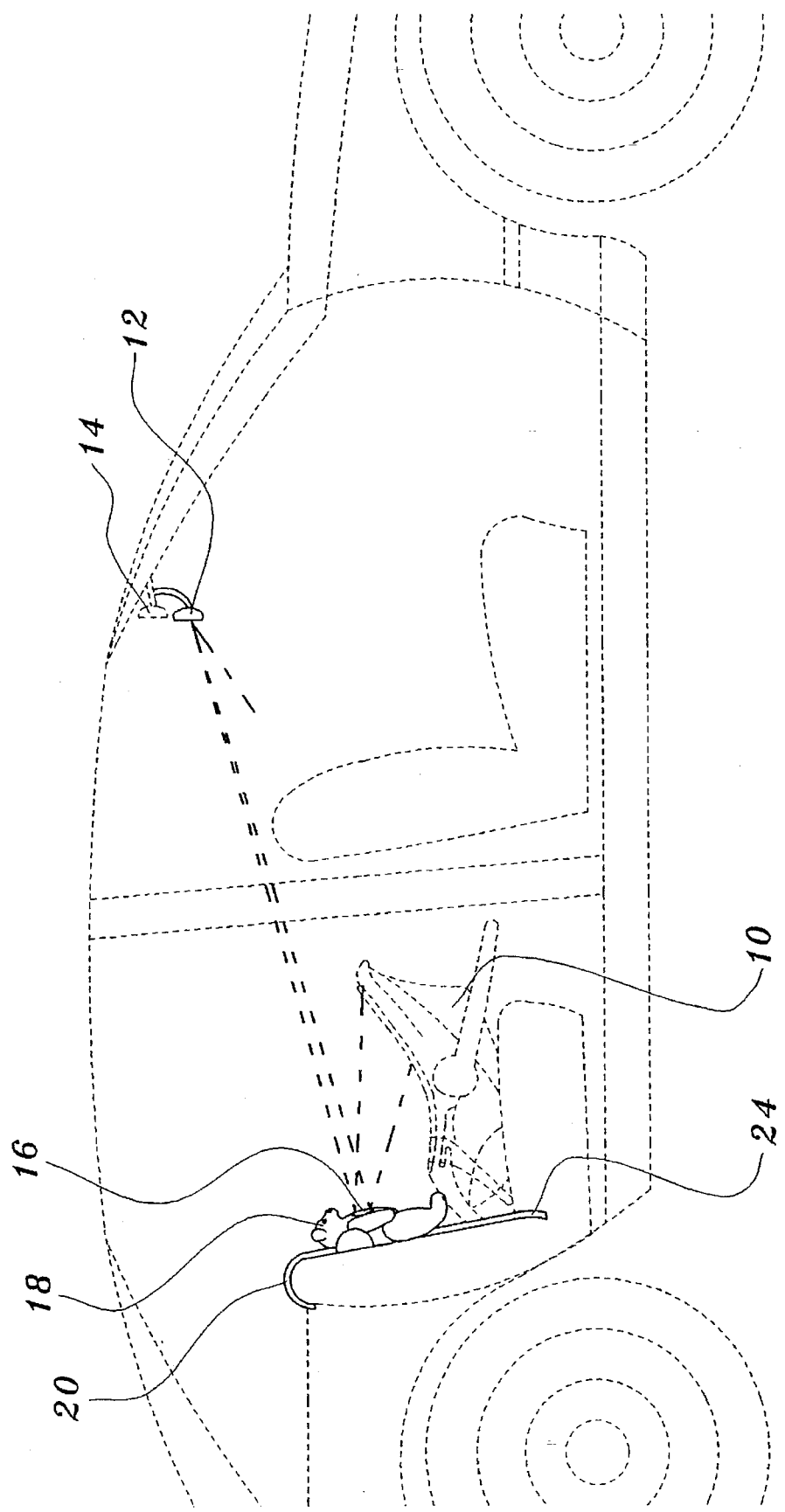
FIG. 1 is a side elevation showing the driver of a car using the front and rear mirrors to observe an infant in the rear seat.
Figure 2:
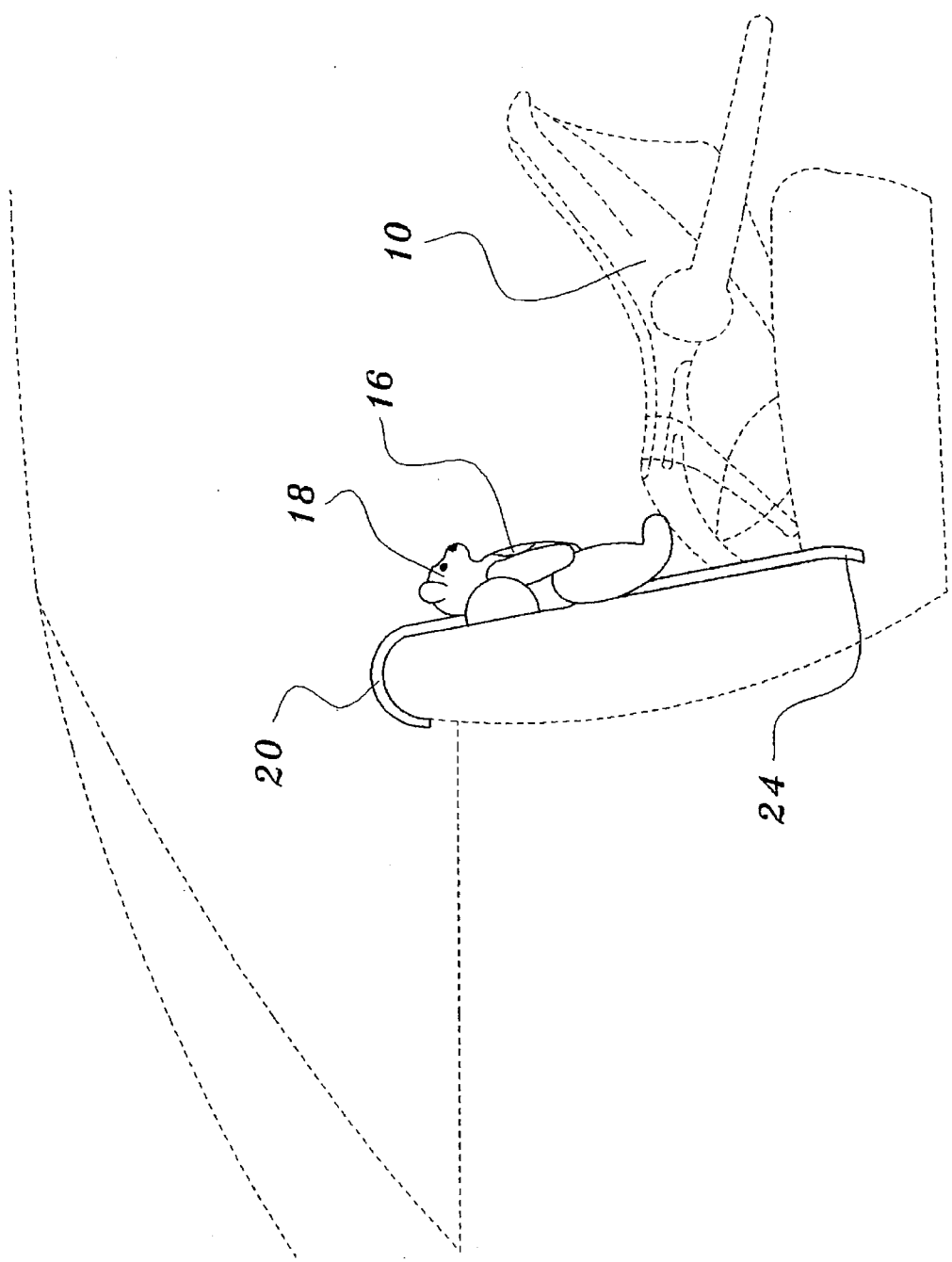
FIG. 2 is a side elevation of the rear mirror assembly where the assembly is in the likeness of a teddy bear.
Figure 3:
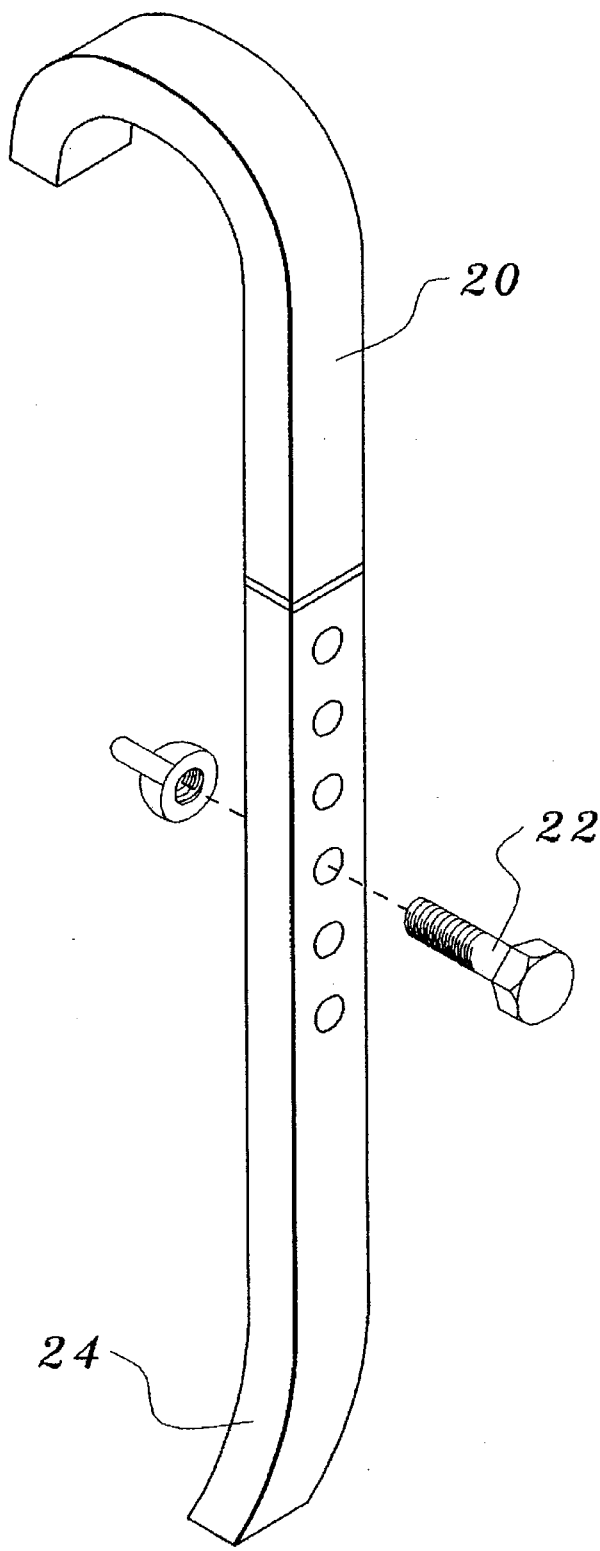
FIG. 3 is a perspective of the mirror assembly mounting bar.

To aid in the correlation of the elements of the invention to the exemplary drawings, the following catalog of the elements is provided:

10 infant carrier
12 front mirror
14 rear-view mirror
16 rear mirror
18 rear mirror assembly
20 rear mirror mounting bar
22 mirror assembly mounting bolt
24 mounting bar foot

DESCRIPTION OF THE PREFERRED EMBODIMENTS

Referring to the drawings, FIG. 1 shows an infant carrier 10 or infant car seat in the rear seat of an automobile. The infant's safety is maximized by having the infant carrier strapped to the seat with a seat belt, facing rearward.

To monitor the infant in its carrier, the driver looks into front mirror 12. Front mirror 12 is adjustable, and in use is positioned to reflect an image of rear mirror 16. The baby's face, reflected in rear mirror 16, is then visible to the driver. Rear mirror 16 may be a standard mirror, a magnifying mirror, or a wide-angle mirror.

Front mirror 12, in one embodiment, is attached to an inner surface of the windshield by a suction cup. Alternatively, the front mirror may be attached to the post on which the auto's rear-view mirror 14 is mounted. In this latter embodiment, attachment to the rear-view mirror post is by means of a clamp; the clamp is tightened with a screw and wing nut for a secure attachment. Front mirror 12 may be mounted above or below rear-view mirror 14, in a position that does not obstruct the driver's forward vision or his view of the rear-view mirror. In all embodiments, the front mirror is adjustable and is positioned to be within the driver's forward field of vision.

A rear mirror assembly 18 includes the rear mirror 16. A baby in the infant carrier 10 can see the driver's face in the rear mirror. To provide a better view of the baby for the driver, rear mirror 16 may be a magnifying mirror; in an alternate embodiment, it may be a wide-angle mirror to provide a view of a larger area. Rear mirror 16 may be adjustable so the system can be adjusted to provide the best view between driver and child, or it may be fixed on the rear mirror assembly 18. Where the rear mirror is adjustable, the preferred method is a ball-and-socket mounting having a relatively high degree of friction, so the mirror will remain in position within a range of possible settings.

To attract the baby's attention, the rear mirror assembly 18 is in the likeness of a teddy bear, clown, or some other figure attractive to a baby. In one embodiment, the rear mirror assembly is a "busy box" or activity box. A busy box, as used herein, is defined as a frame on which are mounted various objects to entertain the infant. The rear mirror assembly also includes battery-powered lights and the like, or other battery-powered devices to hold the baby's attention. In any of the versions, a cassette tape player is provided to play music tapes or recordings of the mother's voice. In lieu of or in addition to a cassette player, a wind-up, spring-driven music player may be provided. Pockets on either side of the rear mirror assembly provide storage for bottles and other necessities.

Rear mirror assembly 18 is secured to mounting bar 20 for installation in the back seat of an auto. Mounting bar 20 has a top in the shape of an inverted J, for hooking over the top of the backrest of the rear seat. Foot 24 of mounting bar 20 engages the slit formed where the backrest meets the seat bench. In one embodiment foot 24 is angled relative to the main length of mounting bar 20 to ensure better engagement with the slit at the back of the seat. The length of mounting bar 20 is adjustable; the bar is made in two telescoping sections so that its length can be varied to accommodate seat backs of different heights. A series of openings in each section receives mounting bolt 22, which both attaches the rear mirror assembly to the mounting bar, and holds the mounting bar at a particular length. Mounting bar 20 releasably engages the rear seat to facilitate installation and removal of the rear mirror assembly.

In an alternate embodiment, mounting bar 20 is a double bar to provide greater stability. The double mounting bar is a continuous, one-piece bar, having curved crosspieces at its top and at the foot connecting the double upright bars. As with the mounting bar described above, the top of the double bar is bent into an inverted-J shape to hook over the top of the rear seat, and its foot is angled to better engage the slit between the seat and the seat backrest. A bracket attached between two sides of the double mounting bar receives a mounting bolt 22 or other means for mounting the mirror assembly.

In use, the infant monitor system is a two-way device; not only can the driver watch the infant in its rear-seat carrier, but the baby can also watch its mother or whomever is driving the car. The rear mirror assembly provides a visual pathway between driver and baby, and also entertains the baby while it rides.

The restrictive description and drawing of the specific examples above do not point out what an infringement of this patent would be, but are to enable one skilled in the art to make and use the invention. Various modifications can be made in the construction, material, arrangement, and operation, and still be within the scope of my invention. The limits of the invention and the bounds of the patent protection are measured by and defined in the following claims.

I claim as my invention:

1. An apparatus for monitoring an infant in a rear seat of an automobile, having a front mirror mounted in a driver's forward field of vision, a rear mirror observable in said front mirror, said rear mirror reflecting an image of an infant carrier in the rear seat, a rear mirror assembly including said rear mirror, wherein the improvement comprises:

said rear mirror assembly including visual and audible means to attract the infant so that the infant's face is oriented towards said rear mirror assembly, a rear mirror assembly mounting bar releasably attached to a backrest of a back seat of the automobile, said mounting bar having a foot, a top in the shape of an inverted J, and means for adjustably mounting said rear mirror assembly, said mounting bar top to engage a top of a rear seat backrest, and said mounting bar foot to engage a slit between said rear seat backrest and a rear seat bench.

2. The invention as described in claim 1, wherein said means for adjustably mounting said rear mirror assembly includes a mirror assembly mounting bolt received by a series of openings in said mounting bar.

3. The invention as described in claim 1, wherein said rear mirror assembly is in the likeness of a teddy bear with said rear mirror mounted on said teddy bear.

4. The invention as described in claim 1, wherein said rear mirror assembly is in the likeness of a clown with said rear mirror mounted on said clown.

5. The invention as described in claim 1, wherein said rear mirror assembly is an activity box with said rear mirror mounted on said activity box.

6. The invention as described in claim 1, wherein said rear mirror assembly includes a cassette tape player.

7. The invention as described in claim 1, wherein said rear mirror assembly includes at least one pocket attached thereto.

* * * * *